Patented June 12, 1945

2,378,310

UNITED STATES PATENT OFFICE 2,378,310

INSECTICIDE COMPOSITION

George E. Lynn and Fred W. Fletcher, Midland, Mich., assignors to The Dow Chemical Company, Midland, Mich., a corporation of Michigan No Drawing. Application October 2, 1942, Serial No. 460,554

4 Claims. (Cl. 167—30).

This invention relates to insecticides, and is particularly directed to a new insecticide composition comprising as a principal toxic ingredient a synthetic ether product.

Metallic arsenates, copper compounds, pyrethrum and rotenone-containing extracts, and the like have been widely used for the control of agricultural and household insect pests. At the concentrations required to give satisfactory kill of many common pests, the inorganic derivatives frequently cause severe injury to plants. Also they are relatively selective in their action so that the application of an assortment of toxicants is frequently required to protect a growing crop from parasite damage. This generally requires a multiplicity of applications due to the reactive nature of many such materials whereby they cannot safely be combined in an all-purpose mixture.

A further problem faced by the parasiticide industry is that of obtaining materials required for the preparation of pest control products. Shortages of essential metals and their salts and the unavailability of the plant extract toxicants make desirable the provision of synthetic organic substitutes therefor.

Objects of the present invention are to provide substitutes for both the inorganic and plant extract insecticidal toxicants, and compositions in which the required amounts of plant extract materials are greatly reduced so as to conserve on the available supplies of the latter. Other objects will become apparent from the following specification.

We have discovered that the alpha,alpha'-di-(halo-phenyl)-dialkyl ethers have insecticidal properties not common to di-aryl-dialkyl ethers as a class and that compositions comprising small proportions of these compounds dispersed in or on inert carriers or in combination with known parasiticides may be employed to accomplish an efficient control of a wide variety of agricultural and household insect pests. When these new toxicants are used to fortify the plant extract materials, they provide for material savings as regards the amount of the latter required by reason of co-operating therewith to exert a synergistic effect whereby controls are obtained of magnitude greater than additive with respect to those predictable from the toxicities of the components of such mixture. Thus in the control of household and certain agricultural parasites, 50 per cent or more of the pyrethrin- or rotenone-containing product usually required may be omitted while still obtaining a composition of satisfactory potency.

The new insecticidal compositions may take the form of solutions, emulsions, dispersions, or dusts, containing the alpha,alpha'-di-(halo-phenyl)-dialkyl ether in small proportions and adapted to be applied directly for the control of insect pests. Alternately the new toxicants may be incorporated with a suitable wetting, dispersing, or solubilizing agent to form a concentrate adapted to be subsequently diluted with suitable carriers. In dust compositions, from about 1 to 5 per cent by weight of toxicant is desirable. In emulsions or dispersions and particularly aqueous dispersions for use in control of agricultural pests, from about 0.01 to about 10 per cent by weight of toxicant is preferred. When employed in solutions adapted for use as household insecticides, the toxicant is generally employed at from about 1 to 10 per cent by weight concentration when used alone. In solutions in combination with pyrethrin- or rotenone-containing extracts, from about 0.1 to about 5 per cent of the synthetic toxicant is suitable. Parasiticidal concentrates may contain from 5 to as much as 90 per cent by weight of toxicant depending upon the particular diluent or dispersing agent employed therein.

In preparing the compositions as described above, it is sufficient to dissolve the toxicant in a suitable non-corrosive solvent to obtain parasiticidal solutions. In the preparation of aqueous dispersions, the toxicant may simply be emulsified with the water, although a preferred method of procedure comprises grinding or otherwise mixing the toxicant with a finely divided inert carrier and/or emulsifying agent and dispersing the resulting composition in water. In the preparation of dusts, the toxicant and finely divided inert carrier, with or without a suitable wetting or sticking agent may be ground together. An alternate procedure comprises wetting the carrier with a solution of the toxicant in volatile organic solvent and thereafter evaporating off the solvent. Concentrates are conveniently prepared by grinding a relatively high proportion of toxicant with a finely divided inert carrier and/or wetting and dispersing agent, or by dissolving the toxicant in a liquid wetting, emulsifying, or solubilizing agent.

Finely divided inert solids which may be used in combination with and as carriers for the toxicant include diatomaceous earth, volcanic ash, talc, wood flour, gypsum, etc. Suitable solvents are those commonly employed in the preparation of household insecticide compositions such as low boiling petroleum distillates, methylethyl ketone, lower aliphatic alcohols, liquid halobenzenes, aliphatic halohydrocarbons, etc. When the toxicant is applied as a constituent of an oil-in-water emulsion composition, solvents therefor such as lubricating oil, wood tar distillate, coal tar distillate, etc., may be employed. Wetting agents adapted for use in conjunction with the new toxicants include soaps, alkali metal caseinates, blood albumen, alkali metal salts of higher alcohol sulfates, partially neutralized sulfonated fatty acids and oils, heavy metal naphthenates, phenol sulfonic acids, etc.

The alpha,alpha'-di-(halo-phenyl)-dialkyl ethers are prepared by dehydrating alpha-(halophenyl)-alkanols with sulfuric acid. This is conveniently accomplished by stirring the alpha-(halo-phenyl)-alkanol with from about ⅓ to 1 volume of 50–90 per cent sulfuric acid at room temperature, separating the resulting oily ethereal product, and subjecting such product to fractional distillation. In a representative reaction, 188 grams (157 milliliters) of a mixture of alpha-(2-chloro-phenyl)-ethanol and alpha-(4-chloro-phenyl)-ethanol is mixed and stirred with 157 milliliters of 50 per cent by volume sulfuric acid at room temperature for 20 hours. The oily layer from the reaction mixture is separated, successively washed with dilute aqueous sodium carbonate and water and fractionally distilled. 109.9 grams of a mixed alpha,alpha'-di-(monochlorophenyl)-diethyl ether product is thereby obtained as an oily liquid boiling at 193°–198° C. at 10 millimeters pressure and having a density of 1.180 at 20° C. By further fractionation of this product there is obtained the alpha,alpha'-di-2-chlorophenyl)-diethyl ether as a colorless, viscous oil boiling at 160°–162° C. at 5 millimeters pressure and alpha,alpha'-di-(4-chloro-phenyl)-diethyl ether as a white crystalline product melting at 70°–71° C. and boiling at 175°–179° C. at 1 millimeter pressure.

The following examples illustrate the invention but are not to be construed as limiting the same.

*Example 1*

78 parts by weight of alpha,alpha'-di-(4-chloro-phenyl)-diethyl ether and 22 parts of sodium lauryl sulfate were ground together to form an insecticidal concentrate. A portion of this product was dispersed in water to obtain a composition containing 2 pounds of the ether toxicant per 100 gallons. This mixture was applied as a spray to the tops of field grown Irish potatoes infested with Colorado potato beetle. The observed kill of beetles was 91 per cent in 2 days. A control determination in which lead arsenate at 3 pounds per 100 gallons was employed gave a kill of 89 per cent in 2 days.

*Example 2*

2.5 grams of a mixed alpha,alpha'-di-(monochloro-phenyl)-diethyl ether product containing 40 per cent of the ortho isomer and 60 per cent of the para isomer was dissolved in 100 milliliters of light petroleum distillate to obtain a spray composition adapted to be employed for the control of flies, mosquitoes, roaches, bedbugs, and the like. When applied against 5 day old house flies in accordance with the well-known Peet-Grady method, this composition gave an average knock-down in 10 minutes of 74 per cent and an average kill in 24 hours of 22 per cent. A control solution containing the extract from ½ pound of pyrethrum flowers per gallon of the petroleum distillate gave a knock-down of 99 per cent in 10 minutes and an average kill of 20 per cent in 24 hours. When 2.5 grams of the synthetic ether toxicant was dissolved in 100 milliliters of this control solution, a composition was obtained which gave a knock-down of 99.9 per cent in 10 minutes and a kill of 64 per cent in 24 hours.

*Example 3*

19.1 parts by weight of alpha,alpha'-di-(4-chloro-phenyl)-diethyl ether, 76.1 parts of diatomaceous earth, and 4.8 parts of sodium lauryl sulfate were ground together to form a parasiticidal concentrate. This concentrate was dispersed in water in such proportion as to give a spray composition containing 1 pound of the ether toxicant per 100 gallons. The dilute aqueous spray was applied for the control of red spider on beans. The observed kill was 100 per cent with substantially no injury to the bean foliage.

*Example 4*

In a similar manner 18.2 parts by weight of alpha,alpha'-di-(2-chloro-phenyl)-diethyl ether, 72.7 parts of diatomaceous earth, and 9.1 parts of sodium lauryl sulfate were compounded to form a concentrate. A water dispersion of this concentrate containing 0.5 pound of ether toxicant per 100 gallons gave a kill against red spider on beans of 96 per cent. An exactly equivalent result as regards kill of spiders was obtained when the isomeric mixture of Example 2 was substituted for the alpha,alpha'-di-(chloro-phenyl)-diethyl ether.

*Example 5*

19.1 parts of alpha,alpha'-di-(monobromophenyl)-diethyl ether boiling at 188°–190° C. at 5 millimeters pressure, 76.1 parts of diatomaceous earth, and 4.8 parts of sodium lauryl sulfate were mixed and ground together and the resulting concentrate dispersed in water to form a spray containing 1 pound of the toxicant per 100 gallons. This spray composition was applied against red spiders on beans substantially as described in Example 3 and found to give an average kill of the spiders in excess of 95 per cent without injury to the bean foliage.

*Example 6*

A similar determination was carried out in which alpha,alpha'-di-(2.4-dichloro-phenyl)diethyl ether boiling at 175°–177° C. at 2 millimeters pressure was substituted for the bromo derivative disclosed in Example 5. The kill obtained with this toxicant in the amount of 1 pound per 100 gallons of spray was 85.5 per cent against red spider on beans.

While the foregoing examples have been illustrative of compositions comprising the alpha,alpha'-di-(halophenyl)-dialkyl ethers alone and in combination with pyrethrin, it is to be understood that mixtures of two or more of such compounds, or combinations thereof with rotenone or rotenone-pyrethrin mixtures, may be similarly employed. Other toxicants adapted to be used in combination with the alpha,alpha'-di-(halo-phenyl)-dialkyl ethers include lead arsenate, sulfur, copper insecticides and fungicides, aryloxy-alkyl halides, aryloxy-alkoxy-alkyl halides, aryloxy-alkyl thiocyanates, aryloxy-alkoxy-alkyl thiocyanates, phenothioxin, phenothiazine, alkali metal and ammonium sulfamates, etc.

Other alpha,alpha'-di-(halophenyl)-dialkyl ethers which may be substituted for those set forth in the foregoing examples include alpha,- alpha'-di-(3-bromo-phenyl)-diethyl ether, alpha,alpha'-di-(2.4.6-tribromo-phenyl)-diethyl ether, alpha,alpha'-di-(2.4.5-trichloro-phenyl)-diethyl ether, alpha,alpha'-di-(2-bromo-4-chloro-phenyl)-diethyl ether, alpha,alpha'-di-(4-chloro-phenyl)-di-n-propyl ether, alpha,alpha'-di-(2-chloro-phenyl)-di-n-propyl ether, alpha,alpha'-di-(4-chloro-phenyl)-di-n-butyl ether, alpha,alpha'-di-(4-bromo-phenyl)-di-isoamyl ether, alpha,alpha'-di-(2-chloro-phenyl)-di-n-octyl ether, alpha-(4-chloro-phenyl)-alpha'-(2-bromo-phenyl)-diethyl ether, etc.

The compositions as set forth above and other parasiticidal mixtures containing the new toxicants of the present invention may be applied generally for the control of insect and mite pests and particularly aphids, thrips, leaf hopper, mosquitoes, gnats, bedbugs, roaches, clothes moths, etc.

The new insecticidal toxicants with which the invention is particularly concerned are those having the following formula,

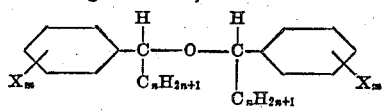

wherein X is selected from the group consisting of chlorine and bromine, $m$ is an integer not greater than 3, and $n$ is an integer from 1 to 7, inclusive. A concurrently filed application Serial No. 460,555, by John E. Livak, describes and claims these ethers as new chemical compounds.

We claim:

1. An insecticidal composition comprising as a principal toxic ingredient a compound of the formula,

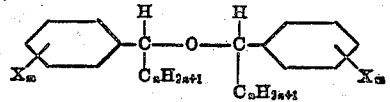

wherein X is selected from the group consisting of chlorine and bromine, $m$ is an integer not greater than 3, and $n$ is an integer from 1 to 7, inclusive, and a carrier therefor.

2. An insecticidal composition comprising as a principal toxic ingredient a compound of the formula,

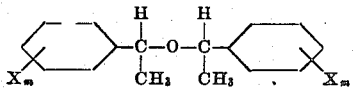

wherein X is selected from the group consisting of chlorine and bromine and $m$ is an integer not greater than 3 and a carrier therefor.

3. An insecticidal composition comprising as a principal toxic ingredient a compound of the formula,

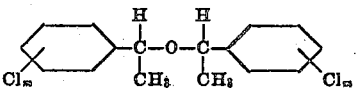

wherein $m$ is an integer not greater than 3 and a carrier therefor.

4. An insecticidal composition comprising as a principal toxic ingredient alpha,alpha'-di-(monochloro-phenyl)-diethyl ether having the formula,

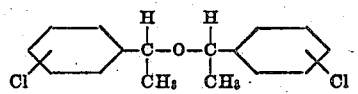

and a carrier therefor.

GEORGE E. LYNN.
FRED W. FLETCHER.